United States Patent [19]

Reiss et al.

[11] Patent Number: 4,517,263
[45] Date of Patent: May 14, 1985

[54] HIGH-TEMPERATURE STORAGE BATTERY

[75] Inventors: Harald Reiss, Leimen; Botho Ziegenbein, Neckarsteinach, both of Fed. Rep. of Germany

[73] Assignee: Brown, Boveri & Cie AG, Mannheim-Käfertal, Fed. Rep. of Germany

[21] Appl. No.: 553,700

[22] Filed: Nov. 21, 1983

[30] Foreign Application Priority Data

Nov. 20, 1982 [DE] Fed. Rep. of Germany ....... 3242901

[51] Int. Cl.³ ............................................. H01M 10/50
[52] U.S. Cl. ...................................... 429/120; 429/26; 429/101
[58] Field of Search ........................... 429/120, 101, 26

[56] References Cited

U.S. PATENT DOCUMENTS 3,837,918  9/1974  Nakabayashi ...................... 429/120
4,383,013  5/1983  Bindin et al. ......................... 429/120

FOREIGN PATENT DOCUMENTS 2645261  4/1978  Fed. Rep. of Germany ...... 429/120
2657183  6/1978  Fed. Rep. of Germany ...... 429/120

Primary Examiner—Charles F. LeFevour
Attorney, Agent, or Firm—Herbert L. Lerner; Laurence A. Greenberg

[57] ABSTRACT

High-temperature storage battery with a double-walled housing and insulating material between the housing walls. At least one storage cell as well as a heat sink is arranged in the interior of the housing. The cooling device for the storage cell is designed as a heat exchanger and at least one and preferably several storage cells are associated with each exchanger.

6 Claims, 3 Drawing Figures

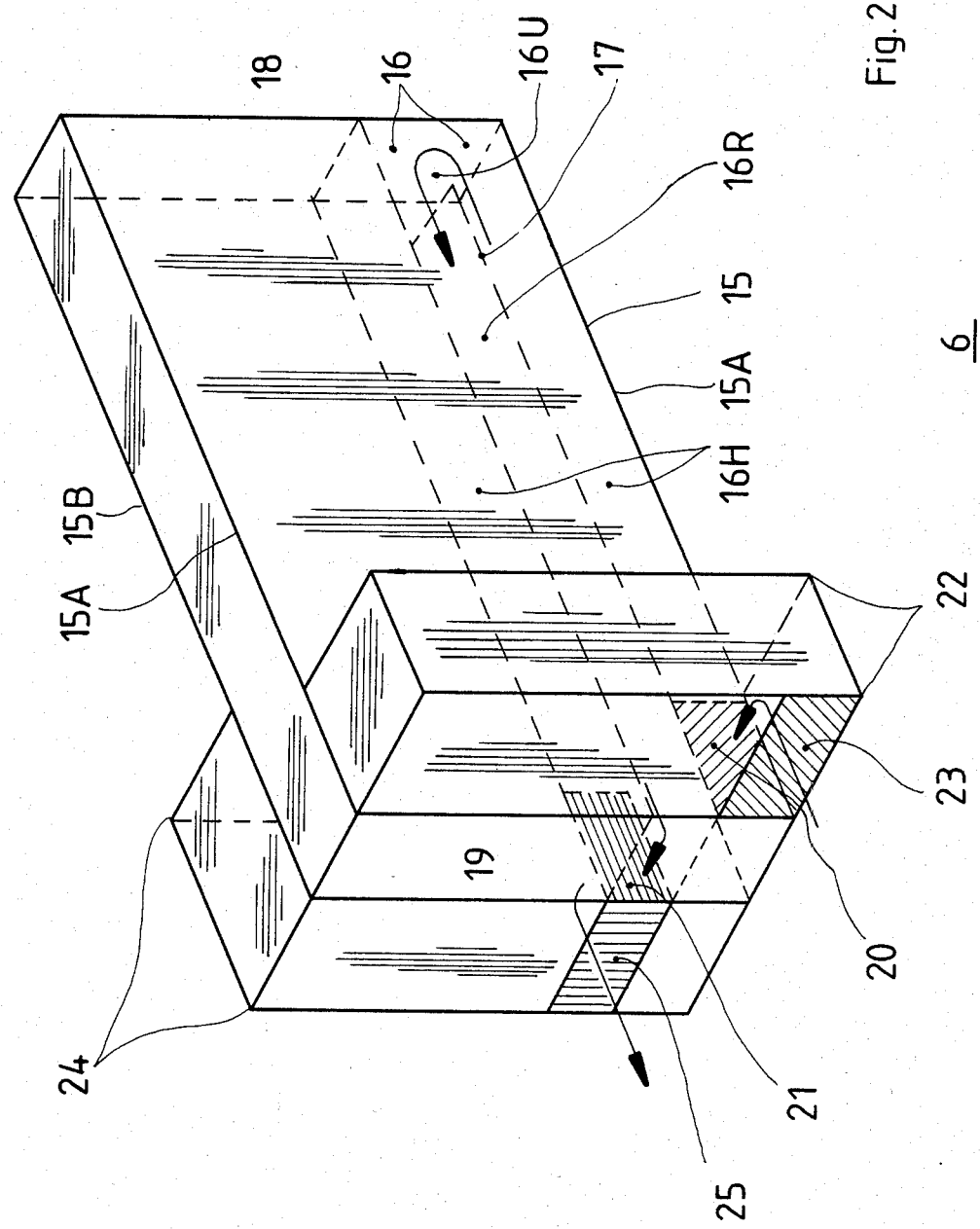

HIGH-TEMPERATURE STORAGE BATTERY

BACKGROUND OF THE INVENTION

1. Field of the Invention

The invention relates to a high-temperature storage battery with a double-walled housing, insulating material between the walls, at least one storage cell in the interior of the housing, and a cooling device for cooling the cell.

2. Description of the Prior Art

Such high-temperature storage batteries which are constructed from electrochemical storage cells, are used increasingly for the electric propulsion of vehicles.

High-temperature storage batteries which are intended as energy sources, must have an energy content of at least 40 kWH, and more than one hundred storage cell are required to obtain this energy content. The high-temperature storage battery operates at a temperature of about 350° C. In order to avoid heat losses, its storage cells are surrounded by thermal insulation. The high-temperature storage battery also has a cooling arrangement which functions to prevent the operating temperature of the storage cell from rising excessively, thereby protecting the latter from damage caused by above normal temperatures.

British Pat. No. 13 86 525 discloses a high-temperature storage battery with storage cells of the sodium-and-sulfur type which are surrounded by insulation. This thermal insulation is defined by a double-wall housing, the insulating material being disposed between the housing walls. The storage cells are arranged in the interior of this housing. The interior of the housing has a feedline and a discharge line through which a coolant enters and is discharged. It is a disadvantage here that the feedline for the coolant is arranged at the one end and the discharge line at the other end of the battery. This means that the coolant introduced into the high-temperature storage battery can cool the storage cells which are arranged in the vicinity of the entrance opening, better than the storage cells which are located in the vicinity of the exit opening of the coolant, since the coolant is heated up to a considerable extent as it flows against and passes the first storage cells. It should be noted here as a further disadvantage that the storage cells are exposed to the coolant in part directly, which causes unfavorable cooling.

SUMMARY OF THE INVENTION

An object of the invention to provide a high-temperature storage battery with a cooling device which permits optimum cooling of all storage cells by cooling each storage cell to such an extent that all storage cells are at the same temperature level.

With the foregoing and other objects in view, there is provided in accordance with the invention a high-temperature storage battery comprising a double-walled housing with insulating material between the two walls of the housing, at least one storage cell in the interior of the housing as well as a heat sink in the form of a heat exchanger associated with the storage cell for cooling the cell.

Other features which are considered as characteristic for the invention are set forth in the appended claims.

Although the invention is illustrated and described herein as embodied in a high-temperature storage battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 is an enlarged, more detailed heat exchanger such as is used in the high-temperature storage battery of FIG. 1, and FIG. 3 shows another arrangement of two heat exchangers above and below the storage cells.

DETAILED DESCRIPTION OF THE INVENTION

Figure 1:
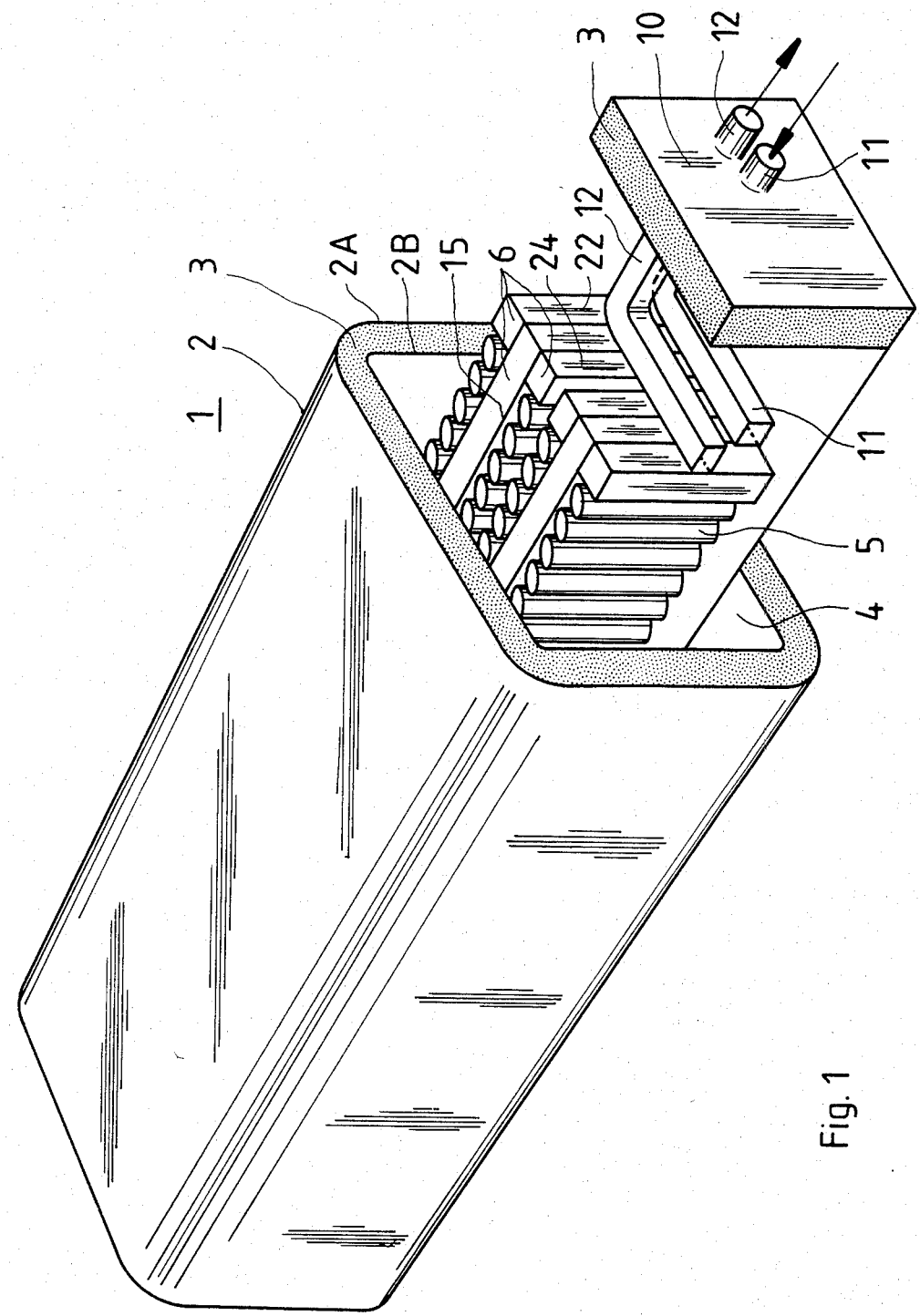
FIG. 1 shows a high-temperature storage battery with two heat exchangers with their large surfaces against the high-temperature storage cells as well as an air coolant inlet and outlet from the atmosphere to the exchangers and then out.

In the present high-temperature storage battery each storage cell gives off the heat produced by it to a heat exchanger, through the interior of which a cooling medium is conducted. Each storage cell interacts with at least one heat exchanger. Each heat exchanger is provided for cooling several storage cells. Due to the fact that each storage cell gives off the heat generated by it to a heat exchanger, the disadvantageous cooling of the storage cells by direct flow by the coolant against them is avoided, making uneven cooling unlikely, if not impossible. The heat exchangers are designed as large-area cooling bodies (heat sinks) which have the form of a slab. By the special conduction of the coolant within the heat exchanger, a counterflow principle is set up, whereby uniform temperature distribution of the outside surface of each heat exchanger may be achieved. The desired temperature distribution is not influenced by the location of the feed and discharge lines of the cooling medium in the heat exchangers and in the battery, respectively. The thermal coupling of the storage cells to the heat exchangers takes place, for one, by radiation transfer which can be improved by suitable preparation of the storage cell surfaces. Secondly, the thermal coupling is accomplished by means of heat conduction by the gas, preferably air, between the storage cells and the heat exchangers which is at rest or in free convection. The thermal coupling between the storage cells and the heat exchangers can be increased by additional solid-body contacts between the storage cells and the heat exchangers. The coolant may be a liquid or a gas, preferably air.

According to the invention, each heat exchanger is designed substantially as a slab-shaped cooling body which has at least two large cooling surfaces. Each cooling body of a heat exchanger has in the interior at least one, and preferably several cooling loops. Each cooling loop is formed by at least two channels which extend parallel to the upper and lower boundary surfaces of the cooling body and are connected at the first end of the cooling body to each other via a respective deflection opening. Each cooling loop has only one entrance and one exit opening for the coolant. The entrance openings of the cooling loops of a heat exchanger are connected to a common feed channel and the exit openings to a common discharge channel for the coolant. The entrance openings of the cooling loops are arranged at the second end of the cooling body in the vicinity of the first cooling surface of the heat exchanger, while the exit openings of the cooling loops are installed in the vicinity of the second cooling surface of the heat exchanger.

In one embodiment of the invention, the storage cells are arranged in a row with their longitudinal axes perpendicular to the cooling loops of the heat exchangers and are installed with a heat-conducting connection along the cooling surfaces.

In another embodiment of the invention, the storage cells are arranged so as to form a slab. The storage cells are mounted and held with no contact between adjacent storage cells. According to the invention, at least one cooling surface of a heat exchanger is placed against the upper and/or lower boundary surfaces of the storage cells so installed. With this relationship of the cooling surfaces and the storage cells, it is possible to connect the innermost electrode of the storage cells electrically insulated to the cooling surfaces, so that heat conduction takes place between the interior of the storage cells and the cooling surfaces, with consequent cooling of the interior regions of the storage cells. According to the invention, each storage cell can additionally be surrounded by a sleeve made of a highly heat-conducting material. These sleeves are connected to the cooling surfaces by forming solid body contacts, thus further improving the heat removal. By the use of such sleeves, the heat removal and the temperature equalization parallel to the longitudinal axis of the storage cell are promoted considerably.

The invention will be explained in the following, referring to the drawings.

The high-temperature storage battery 1 shown in FIG. 1 has a double-walled metallic housing 2. The latter in the embodiment shown here is in the form of a slab. The outer and the inner housing wall 2A and 2B are made of steel. They are arranged at a pre-settable distance from each other with a space between them which is filled with insulating material 3. In addition, this space is evacuated of air. The housing walls 2A and 2B are designed so that the evacuated space is hermetically sealed to the outside and the inside. An oxide-ceramic powder can be used, for instance, as insulating material 3. The housing 2 has an interior 4 for receiving the storage cells 5. In the embodiment shown here, two heat exchangers 6 are arranged in the interior 4. The two heat exchangers each have a large area cooling body 15 which has the form of a slab. The two heat exchangers 6 are installed so that the large cooling surfaces 15A and 15B of the cooling body 15 shown in detail in FIG. 2 are positioned vertically. As can be seen from FIG. 1, storage cells 5 are arranged on both sides of each heat exchanger 6. The storage cells 5 are installed along the cooling surfaces 15A and 15B one behind another, forming a row. Each row of storage cells 5 is held with each storage cell 5 of the row resting against the cooling surface 15A or 15B of the heat exchanger 6 adjacent to it, to generate a good heat-conducting bond between the cooling surface 15A, 15B and the storage cell B. Between two successive storage cells 5 of a row, a narrow gap is logically provided. Through the use of holders (not shown here) the storage cells 5 are fastened in this desired position. The dimensions of the heat exchangers 6, particularly those of their cooling surfaces 15A and 15B are chosen so that each storage cell of a row is in close contact with the cooling surface 15A or 15B at least on one side of its entire length which is associated with this row of storage cells 5. The height of the cooling surfaces 15A and 15B is slightly greater than that of the storage cells 5. The length of the cooling surfaces 15A and 15B of each heat exchanger 6 likewise exceeds only slightly the length of the storage cell rows 5 in contact with them. In the embodiment example shown here, two such heat exchangers 6 are arranged in the interior of the high-temperature storage battery 1, with which it is possible to cool four rows, each with 28 storage cells 5 arranged one behind the other. The high-temperature storage battery can, if required, also be made larger or smaller, i.e. more than two or less than two heat exchangers 6 can be arranged within such a high-temperature storage battery 1. By appropriate choice of the dimensions of these heat exchangers 6, a larger or smaller number of storage cells 5 can be cooled.

The high-temperature storage battery 1 is designed so that the storage cells, together with the heat exchangers 6, can be inserted into the interior 4 or can be removed therefrom again if required. For this purpose, the housing is sealed at one end-face by a plug 10. The latter is likewise a double-wall design. Insulating material 3 is arranged between its inner and outer housing wall. The dimensions of the plug 10 are chosen so that it will completely close off the opening in the end-face of the housing 2. The two heat exchangers 6 are connected to a line 11, or feeding-in the coolant, which line 11 has a connection in the vicinity of the two heat exchangers 6. The line 11 is brought through the thermal insulation of the plug 10 to the outside. A second line 12 is provided for discharging the heated-up coolant, which line 12 likewise has a connection in the vicinity of the two heat exchangers 6. The line 12 is also brought to the outside through the insulation 3 of the plug 10.

In FIG. 2, one of the heat exchangers 6 is shown in detail. This heat exchanger 6 has a centrally arranged large-area cooling body (heat sink) 15 in the form of a slab. The height of its large cooling surfaces 15A and 15B is slightly larger than the height or the length of the storage cells 5, enabling the latter to be arranged with their longitudinal axes perpendicularly to the cooling loop 16 of the cooling body 15. The length of the cooling surfaces 15A and 15B is slightly larger than the length of the rows of storage cells 5 which are to be brought into contact therewith. The narrow side of the cooling body 15 has, in the embodiment example shown here, a width between 1 and 3 cm. Several cooling loops 16 are arranged in the interior of the heat sink 15 for conveying the coolant through the heat exchanger 6. The cooling loops 16 extend parallel to the upper and lower boundary surfaces of the heat sink 15. In the embodiment example of the heat exchanger 6 shown here, three such cooling loops 16 are provided in the interior of the heat sink 15. One of these cooling loops 16 is shown in detail. Each cooling loop 16 is formed by two canals 16H and 16R, which are arranged vertically below each other. The canals 16H and 16R extend parallel to the upper and lower boundary surfaces of the heat sink 15. The partition 17 which is arranged horizontally between the two canals 16H and 16R is interrupted in the vicinity of the first end 18 of the heat sink 15, thus forming a deflection opening 16U between the two canals 16H and 16R. At the second end of the cooling body 15, the canal 16H has an entrance opening 20 for the coolant in the vicinity of the first large cooling surface 15A. The canal 16R has an exit opening 21 at the second end 19 of the heat sink 15, in the vicinity of the second large cooling surface 15B. As may be seen further from FIG. 2, the entrance openings of the canals 16H at the second end 19 of the heat sink 15 are in communication with a rectangular feed-canal 22. The latter is placed perpendicularly against the large cooling surface 15A and is connected to the heat sink 15 in a gas-tight manner. The feed-canal 22 has the same height as the heat sink 15. The width of feed-canal 22 extends slightly outward beyond the row of storage cells, not shown here, which cells are arranged at the cooling surface 15A. The depth of feed-canal 22 is determined by the amount of cooling medium to be conducted through the heat exchanger 6. The feed-canal 22 has an entrance opening 23 for the coolant. In the embodiment example shown here, the entrance opening 20 is in the lower region of the feed-canal 22. If required, however, it can also be installed in the upper region. The exit opening 21 of the canal 16 at the second end 19 of the heat sink 15 in the region of the second large cooling surface 15B opens into a discharge canal 24 receiving the coolant after passage through heat exchanger 6. This discharge canal 24 is similar in construction to the feed-canal 22, and is connected to the heat sink 15. The discharge canal 24 has an exit opening 25 at its lower end, for discharge of the coolant. If required, the exit opening 25 can also be arranged at the upper end of the discharge canal 24. The entrance opening 23 of the heat exchanger 6 is connected to the line 11 shown in FIG. 1, while the exit opening 25 of the discharge canal 24 is in communication with the line 12.

To cool the storage cells 5, a fluid coolant, for instance air, is fed from the outside through the line 11 to the heat exchanger 6. The coolant air enters the feed-canal 22 and then flows into the openings 20 of the canals 16H. From there the air is conducted to the first end 18 of the heat sink 15, where it flows through the deflection openings 16U provided in the partitions 17 into the second canal 16R of the cooling loops 16. The coolant is returned through second canal 16R to the second end 19 of the heat sink 15 and flows through the opening 21 in the canal 16R, into the discharge canal 24. The cooling medium absorbs the heat given off by the storage cell 5 to the cooling surfaces 15A and 15B during passage of the coolant through the above-described cooling loops 16. Due to the counterflow of coolant fluids in the system of the cooling loops 16, the two cooling surfaces 15A, 15B have a uniform temperature distribution, so that thereby uniform cooling of all storage cells adjacent to the heat sink 15 may be effected. The warmed-up cooling air is discharged to the outside via the discharge 12 from the heat exchangers 6 and the interior 4 of the high-temperature storage battery.

Valves, not shown here, may be incorporated into the entrance openings 23 of the feed-canals 22, to control the quantity of the coolant to be fed-in and the duration of feeding-in the coolant. Prescribed control of the cooling can be accomplished by means of sensors, not shown here, which can act on the valve in a control relationship.

In the event of an overload of the high-temperature storage battery 1, a very large increase of the internal temperature of the storage cells can come about. To absorb such surges in temperature, an additional, directly acting cooling for the storage cells is available, by providing openings (not shown here) in the cooling surfaces 15A and 15B of the heat sinks 15, particularly in the vicinity of the canals 16H. The openings can be opened and shut via a temperature-controlled regulating device which responds, upon a rise in temperature in the interior 4 of the high-temperature storage battery 1, to a value which is substantially above the operating temperature of the storage cells 5. The coolant can then be conducted directly into the interior 4 via these openings, effecting direct cooling of the storage cells by the cooling medium. In this case, a further discharge (not shown here) for the coolant conducted into the interior 4 is necessary.

In FIG. 3, another arrangement of the heat exchangers 6 and the storage cells 5 associated with them is shown. The storage cells 5 are positioned so that they form a slab. Adjacent storage cells are arranged not to touch each other but leave a small clearance between them. As can be seen in FIG. 3, two heat exchangers 6 are provided for cooling the storage cells 5. A first heat exchanger 6 is disposed above the upper boundary surfaces 5O of the storage cells 5, while the second heat exchanger 6 is placed against the lower boundary surfaces 5U of th storage cells 5. The heat exchangers 6 are arranged as closely to the storage cells as possible. The two heat exchangers 6 are similar in design to the heat exchanger 6 which is shown in detail in FIG. 2. The removal of the heat from the storage cell 5 is accomplished in this arrangement not only via the long sides of the cells but particularly also via their upper and lower end faces. The heat removed is through radiation equalization, heat conduction and convection by the air between the storage cells or by an inert gas in the interior 4 of the high-temperature storage battery. This arrangement of the heat exchanger 6 and the storage cell 5 permits greater packing density of the storage cells.

To further increase the heat removal in this arrangement it makes sense to improve the solid-body contact between the storage cells 5 and the heat exchangers 6. For this purpose, each storage cell 5 is surrounded by a sleeve (not shown here) of a highly heat-conductive material. The length of the sleeves is made so that they adjoin directly the heat exchanger surfaces 6 and are connected to them in a heat-conducting manner. The use of such sleeves is also possible and logical in the arrangement of heat exchangers 6 and storage cells shown in FIG. 1. Preferably, the sleeves are made flat in the vicinity of the contact surfaces, obtaining thereby a larger area contact between the sleeves and the cooling surfaces 15A and 15B.

In the arrangement of the heat exchangers 6 above and below the storage cells 5 it is possible to connect the inner electrode (not shown here) of the storage cell 5 to at least one heat exchanger 6 in a heat-conducting but electrically insulating manner. By this measure not only the housings of the storage cells 5 may be cooled but also their interior to a sufficient degree.

The foregoing is a description corresponding, in substance, to German application P 32 42 901.0, dated Nov. 20, 1982, international priority of which is being claimed for the instant application, and which is hereby made part of this application. Any material discrepancies between the foregoing specification and the specification of the aforementioned corresponding German application are to be resolved in favor of the latter.

We claim:

1. A high-temperature storage battery comprising a double-walled housing with insulating material between the two walls of the housing, a plurality of storage cells in the interior of the housing associated with one or more heat exchangers in the form of a slab-shaped heat sink which have at least two large cooling surfaces and in their interior several cooling loops, each cooling loop formed by at least two canals arranged vertically one below the other and connected to each other at a first end of the heat sink via a deflection opening, each cooling loop having only one entrance opening and only one exit opening for introduction and discharge of a cooling medium, the entrance opening is in communication with a common feed canal and the exit opening is likewise in communication with a common discharge canal for the coolant, the entrance opening of the cooling loop is arranged at a second end of the heat sink in the vicinity of a first cooling surface of said two large cooling surfaces and the exit opening of the cooling loop is installed at the second end in the vicinity of the second cooling surface of said two large cooling surfaces, the storage cells having their longitudinal axes perpendicular to the canals of the cooling loops, and the storage cells arranged in a row and installed in a heat-conducting connection along the cooling surfaces.

2. High-temperature storage battery according to claim 1, wherein an electrically insulated connection connects the interior of the storage cells via an inner electrode with a cooling surface for removing heat from the interior of the cell.

3. High-temperature storage battery according to claim 1, wherein each storage cell is surrounded by a sleeve of highly heat-conductive material which is connected to the cooling surfaces via solid body contacts.

4. A high-temperature storage battery comprising a double-walled housing with insulating material between the two walls of the housing, a plurality of storage cells in the interior of the housing associated with one or more heat exchangers in the form of a slab-shaped heat sink which have at least two large cooling surfaces and in their interior several cooling loops, each cooling loop formed by at least two canals arranged vertically one below the other and connected to each other at a first end of the heat sink via a deflection opening, each cooling loop having only one entrance opening and only one exit opening for introduction and discharge of a cooling medium, the entrance opening is in communication with a common feed canal and the exit opening is likewise in communication with a common discharge canal for the coolant, the entrance opening of the cooling loop is arranged at a second end of the heat sink in the vicinity of a first cooling surface of said two large cooling surfaces and the exit opening of the cooling loop is installed at the second end in the vicinity of the second cooling surface of said two large cooling surfaces, and the storage cells are arranged in a slab-like form with a small clearance between adjacent storage cells, and at least one cooling surface of the heat exchanger is placed against one surface of the upper and lower boundary surfaces of the slab-like storage cells.

5. High-temperature storage battery according to claim 4, wherein an electrically insulated connection connects the interior of the storage cells via an inner electrode with a cooling surface for removing heat from the interior of the cell.

6. High-temperature storage battery according to claim 4, wherein each storage cell is surrounded by a sleeve of highly heat-conductive material which is connected to the cooling surfaces via solid body contacts.

* * * * *